United States Patent
Szwaykowski

(10) Patent No.: US 8,482,740 B1
(45) Date of Patent: Jul. 9, 2013

(54) COMPUTER GENERATED REFERENCE FOR MEASUREMENTS OF ASPHERIC SURFACES

(75) Inventor: Piotr Szwaykowski, Tucson, AZ (US)

(73) Assignee: Engineering Synthesis Design, Inc., Tucson, AZ (US)

( * ) Notice: Subject to any disclaimer, the term of this patent is extended or adjusted under 35 U.S.C. 154(b) by 229 days.

(21) Appl. No.: 12/828,031

(22) Filed: Jun. 30, 2010

Related U.S. Application Data

(60) Provisional application No. 61/269,932, filed on Jul. 1, 2009.

(51) Int. Cl.
*G01B 11/02* (2006.01)

(52) U.S. Cl.
USPC .......................................................... 356/511

(58) Field of Classification Search
USPC .......................................................... 356/511
See application file for complete search history.

(56) References Cited

U.S. PATENT DOCUMENTS

| 4,776,101 A | 10/1988 | Ishibai ............................ 33/551 |
| 5,737,079 A | 4/1998 | Burge et al. .................... 356/348 |
| 5,777,738 A * | 7/1998 | Kulawiec ....................... 359/512 |
| 6,456,382 B2 | 9/2002 | Ichihara et al. ................ 356/513 |
| 6,809,845 B1 * | 10/2004 | Kim et al. .......................... 359/9 |
| 2007/0110334 A1 * | 5/2007 | Takahashi et al. ............. 382/276 |

* cited by examiner

*Primary Examiner* — Tu Nguyen
(74) *Attorney, Agent, or Firm* — Hayes Soloway P.C.

(57) ABSTRACT

A computer generated phase map and corresponding set of interference fringes calculated from a theoretical prescription of a measured aspheric surface comprises a Computer Generated Reference (CGR) that is used in an interferometer equipped with a spherical and/or flat reference element. moiré fringes created between real interference fringes and the CGR describe the difference between the measured object and its prescription. The moiré fringes can be nulled making the measurement of the aspheric surface analogous to the measurements of the regular spherical and/or flat surfaces.

19 Claims, 1 Drawing Sheet

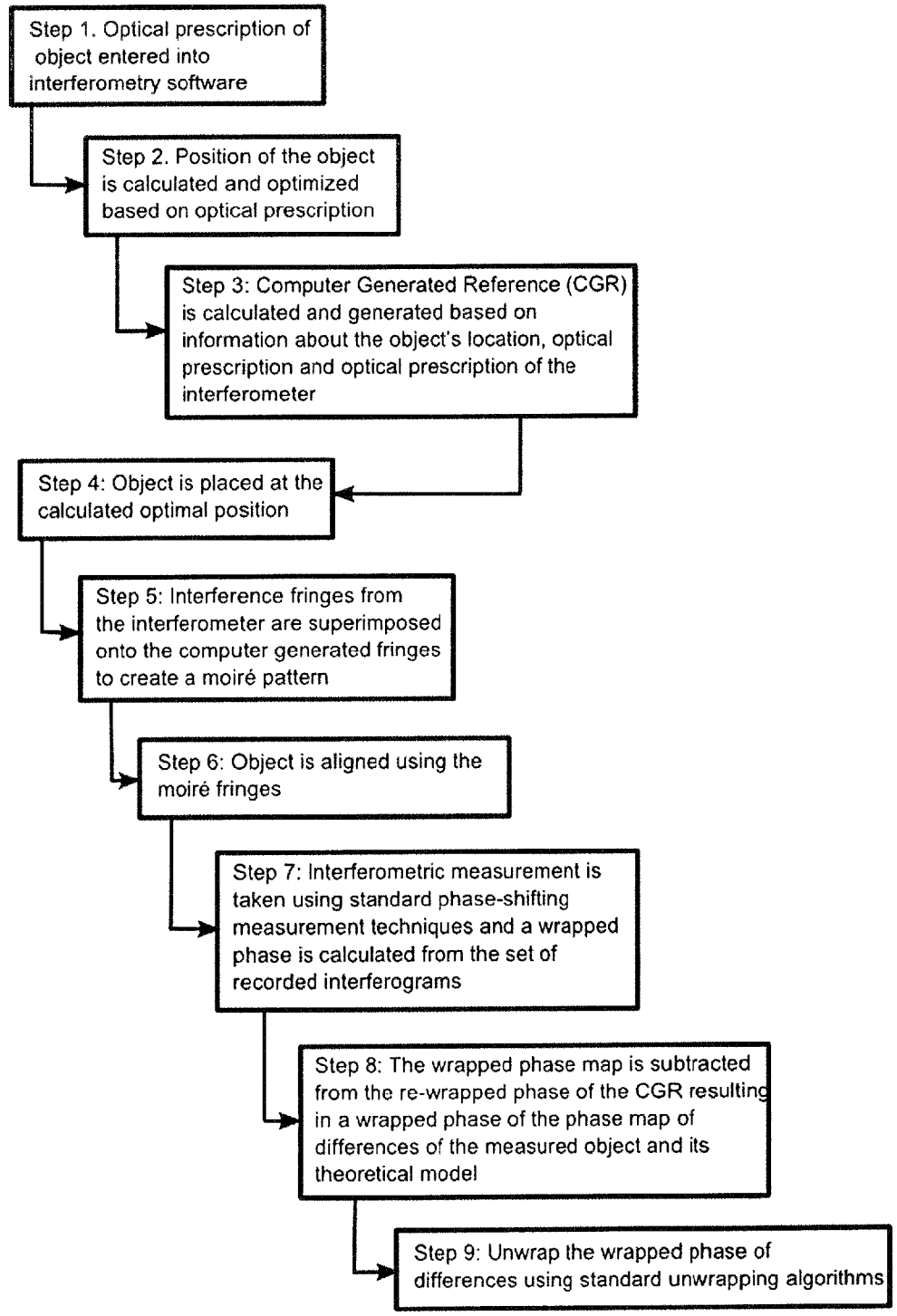

COMPUTER GENERATED REFERENCE FOR MEASUREMENTS OF ASPHERIC SURFACES

CROSS REFERENCE TO RELATED APPLICATION

This application claims priority from U.S. Provisional Application Ser. No. 61/269,932, filed Jul. 1, 2009, the contents of which are incorporated herein by reference.

FIELD OF THE INVENTION

The present invention relates to interferometry, in particular, interferometric methods of measuring aspheric surfaces through creation and utilization of a Computer Generated Reference (CGR). The Computer Generated Reference refers to a theoretical distribution of phase and a corresponding set of computer generated fringes at the detector plane of an interferometer. The CGR can be computed based on the knowledge of the surface profile of the object under test, its location with respect to the interferometer, and a detailed optical prescription of the optical system of the interferometer.

BACKGROUND OF INVENTION

Interferometers have been known and used for a long time. Interferometry is a widely used method for measuring surface profiles (often to nano-meter resolutions) and other physical properties of materials, gases and liquids. There are many types of interferometers, characterized by their optical designs and layouts. Some classical types are Twyman-Green, Fizeau, Michaelson, Mach-Zender, and Fabry-Perot. Each of these interferometer types produces interference patterns, called interferograms. These interferograms can be used to analyze characteristics of an object under test.

Interferograms are generated by the interference of a test wavefront and a reference wavefront. The test and reference wavefronts typically originate from a common "source" wavefront; they are obtained by splitting the source wavefront. The test wavefront then obtains its "test" information by interacting with the object under test (typically by reflecting off of, or transmitting through a test object). Similarly, the reference wavefront obtains its "reference" information by interacting with a "known" reference object, such as a super polished flat glass plate. Superimposing or interfering these two wavefronts spatially (i.e. on a flat screen, or on an image sensor such as a CCD) produces an interferogram.

Interferometers require coherent superposition of a "test beam" (of light) with a "reference beam" resulting in the formation of an interferogram in the overlapping region of the two beams. This interferogram data can then be captured using various types of detectors, such as a camera, for analysis.

The spatial distribution of intensity levels within the interference pattern relates to differences in the phase of the test and reference wavefronts. Note that the reference wavefront is acted on by a known "measurement standard," such as an optical "reference" surface, and the test wavefront is acted on by the unknown object under test. Measuring the difference between the two wavefronts allows the test wavefront to be determined. In other words, the process is akin to comparing the "unknown" test wavefront to a "known" standard, the reference wavefront.

In known phase-shifting interferometry techniques, interference between the light beams reflected from the test and reference surfaces are sampled as a function of phase shift and subsequently analyzed with a phase-shifting interferometry algorithm to extract the test surface phase map, which may be converted into physical units using the known wavelength of the laser beam.

As described above, interferometric measurements of optical surfaces are typically performed through comparison with a proper reference surface. In practice, high quality references exist only for flat and spherical surfaces. As a result, measurements of aspheric surfaces are hindered by a lack of suitable reference elements. Furthermore, the aspheric surfaces form an infinite set. That is, there are an infinite number of potential variations of aspheric surfaces, and thus it is very unlikely that a proper set of reference elements could be created to cover all types of aspheric surfaces. Two techniques are commonly used to provide such references: so called Null Lenses (NL) and Computer Generated Holograms (CGH).

The following discussion of null lenses derives from U.S. Pat. No. 6,456,382 to Ichihara et al., which describes the conventional interferometer systems using null lenses. Null lenses typically use spherical lenses comprising spherical surfaces, and zone plates wherein annular diffraction gratings are formed on plane plates. In a conventional interferometer system using a null lens, the component of the plane wave transmitted through the Fizeau surface is converted into a measurement wavefront (null wavefront) by the null element and assumes a desired aspheric design shape at a measurement reference position, following which it arrives at a test surface of a test object previously set at the reference position. The light arriving at the test surface is then reflected and interferes with the light component reflected from the Fizeau surface, and forms monochromatic interference fringes inside the interferometer system. These interference fringes are detected by a detector such as a CCD. Similar measurements can be performed using a Twyman-Green interferometer.

To accurately measure the test surface, the null element must be manufactured with advanced technology, since there must be no error in the null wavefront. Thus, the optical characteristics of the null element must be accurately measured beforehand with great precision. Based on these measurements, the shape of null wavefront is then determined by ray tracing. The manufacture of a usable null element takes a long time, which lengthens the measuring process, and adds expense to the measurement technique.

U.S. Pat. No. 5,737,079 to Burge et al. describes a method of testing aspheric surfaces by using a computer-generated hologram (CGH) that is written on the reference surface of the test plate using lithographic techniques.

However such references are expensive to make and are appropriate for testing only a specific type of aspheric surfaces for which they have been designed. Additionally, such reference elements require precision alignment of multiple optical components making the measurements rather tedious and difficult. As such, these types of references are used primarily to measure expensive optical components like mirrors and lenses for astronomical telescopes or parts of military equipment.

Other methods of aspheric measurements are based on the use of mechanical styluses that are dragged across the surface. For example, U.S. Pat. No. 4,776,101 to Ishibai describes such a measurement technique.

There are further problems with the prior art aspherical object measurement techniques. For example, in an interferometer using a standard spherical or flat reference element for measurements of aspheric surfaces, both interfering beams (test and reference) may significantly differ from each other making nulling of the interference fringes impossible. Also, both beams travel along different optical paths inside the interferometer and errors introduced by aberrations of the optical system of the interferometer cannot be compensated.

Measurements performed with these prior art types of aspheric surface interferometers generally consist of the following steps:

Placement and alignment of the measured aspheric element at the measurement location. The alignment of the measured surface is difficult and critical as the optical axis of the interferometer should be co-linear with the optical axis of the aspheric surface. Otherwise errors will be introduced to the measurements.

Recording of a series of phase shifted interferograms in order to compute a phase map.

Unwrapping the phase map to account for discontinuities in the phase map. The unwrapping of very dense fringe patterns is critical and can be quite challenging as the fringe densities can be higher then the spacing between neighboring pixels.

Ray tracing through the optical system of the interferometer based on the unwrapped phase map. The ray tracing operation removes errors due to unequal optical paths of the test and reference beams Subtraction of the optical prescription of the aspheric surface.

The above described procedure presents several critical problems. The alignment of the measured object with respect to the optical axis of the interferometer is done in the presence of very dense interference fringes that are usually a poor guidance for the alignment. The fringes cannot be nulled and as a result the alignment has to be done by means of mechanical features. Errors in alignment will lead to measurement errors—typically with added coma and astigmatism in the final results.

Also, unwrapping of the very dense fringes poses a significant problem as the unwrapping algorithms must take into account phase discontinuities that may exist at intervals larger than $2\pi$. The unwrapping errors in this case can be large and can propagate quickly, rendering the resulting phase maps useless. In addition, any undesirable features in the interferograms, such as fringes resulting from surface scratches, hot spots, stray light reflections or surface blemishes, will significantly exaggerate problems with phase unwrapping.

Moreover, the ray tracing procedure based on the unwrapped phase maps obtained at the detector plane is sensitive to measurement noise. The noise typically will be amplified in the process and usually will manifest itself as spikes in the final measurement. These spikes can be of significant amplitude and although localized they have to be filtered out from the final results.

These problems will be greatly aggravated in case of measurements of off-axis aspheric surfaces, surfaces with a hole in the middle or surfaces without axial symmetry.

Thus, a method that would be capable of simplifying the alignment of the aspherical object to be measured, avoiding the unwrapping of very dense fringe patterns, and eliminating the need for ray tracing would be very desirable to overcome some of the most limiting characteristics of the prior art instruments.

SUMMARY OF THE INVENTION

The current invention is directed at interferometric methods of measuring aspheric surfaces that overcomes the aforesaid and other disadvantages of the prior art. More particularly, the present disclosure provides for measuring aspheric surfaces through creation and utilization of a Computer Generated Reference (CGR). The Computer Generated Reference refers to a theoretical distribution of phase and a corresponding set of computer generated fringes at the detector plane of an interferometer. The CGR can be computed based on the knowledge of the surface profile of the object under test, its location with respect to the interferometer, and a detailed optical prescription of the optical system of the interferometer. Essentially, the CGR is a phase map that would result from the interference of a reference beam with the test beam in the plane of detector if the object under test conformed exactly to its optical prescription.

In one aspect, the disclosure provides a method of measuring the surface of an aspheric object, comprising the steps of: calculating a theoretical phase map and interference fringes resulting from the theoretical interference of a beam of light reflected from a reference element and a beam of light reflected from a theoretical model of the object, based on an optical prescription of the object; and generating a phase map and interference fringes corresponding to the calculated theoretical phase map and interference fringes.

The method described above may further include the steps of: superimposing interference fringes produced from the interference of a beam of light reflected from the reference element and a beam of light reflected from the object onto the generated interference fringes, thereby creating moiré fringes; subtracting a wrapped phase map resulting from the interference of the beam of light reflected from the reference element and the beam of light reflected from the object from the wrapped theoretical phase map; unwrapping the resulting phase map of differences; and processing the resulting phase map of differences to determine the differences between the measured object and its theoretical prescription.

The object may further be positioned at a calculated optimal position with respect to the interferometer, based on theoretical properties of the object. Moreover, the position of the object may be adjusted using the moiré fringes as guides.

In other aspects of the invention, the object may be scanned with a scanning device, the interference fringes may be resolved by a sub-Nyquist camera, and the interference fringes may be produced in one of a Twyman-Green, Fizeau, Michaelson, Mach-Zender, Fabry-Perot or any other type interferometer.

Accordingly, several advantages of the disclosure are to simplify alignment of the aspherical object to be measured by standard nulling procedures utilizing the moiré fringes, as opposed to the precision alignment of multiple optical components required by prior art techniques. Also, the unwrapping of very dense fringe patterns can be avoided by calculating a differential map between measured object and its theoretical model which requires only standard unwrapping algorithms. Augmentation of noise in the measurement through ray tracing can be also eliminated because the proposed method does not require ray tracing based on the measured phase distributions.

BRIEF DESCRIPTION OF THE DRAWINGS

Still further objects and advantages will become apparent from the detailed description, taken in conjunction with the accompanying drawing FIG. 1, which illustrates a preferred embodiment of the invention.

The features, functions and advantages that have been discussed can be achieved independently in various embodiments of the present disclosure or may be combined in yet other embodiments.

DETAILED DESCRIPTION OF PREFERRED EMBODIMENT

The CGR may be created individually for each type of surface that needs to be measured. The resulting set of computer generated fringes can be compared with the real live fringes formed in the interferometer by superimposing both sets in a manner that leads to creation of moiré fringes. The moiré fringes in this case are indicators of differences between the measured object and its theoretical model. If the measured object matches the theoretical model perfectly the Moiré fringes become nulled.

Thus, the Moiré fringes can be used the same way as standard interference fringes are used in measurements of flat or spherical surfaces. That is, they can be used as guidance during the alignment process as well as an indicator of differences between the measured object and its theoretical counterparts.

Furthermore, the phase map of the CGR can be re-wrapped using software methods producing a discontinuous phase surface with phase jumps equal to $\lambda$. Such prepared phase surface (from CGR) can be compared directly with the wrapped phase obtained as a result of measurement using the phase-shifting technique. By subtracting the CGR phase map from the measured phase map a wrapped phase map of differences between the measured object and its theoretical model is created. This wrapped phase map is equivalent to a phase map that could be obtained from the moiré fringes. It contains structures that are much coarser than the structures associated with the interferograms of the measured object. Thus, in order to obtain information about the differences between measured aspheric surface and its prescription it is necessary to unwrap only rather coarse patterns that are relatively simple to deal with, as opposed to the unwrapping of very dense fringes produced by prior art methods.

Moreover, scanning interferometry methods are known in the art. For example, the commonly-owned U.S. Pat. No. 7,561,279 to Castonguay and Szwaykowski describes a simultaneous phase shifting interferometer combined with a mechanical scanner to translate a measured object. Such a scanning method may be employed with the current invention to process the entire surface of an object by scanning the object.

A preferred embodiment of the current invention consists of an interferometer using standard flat or spherical reference elements to measure aspheric surfaces. Such interferometer may be equipped with a sub-Nyquist camera (a pixelated detector with mask in a form of small pinhole covering each pixel in the detector) or a very high resolution standard camera in order to resolve very dense fringe patterns. In reference to FIG. 1, the measurement of the aspheric surfaces may involve the following steps, although the steps need not be performed in the following particular order:

An optical prescription of a measured object is entered into the interferometry software.

Based on the properties of the theoretical model of the measured object, an optimal position of the object with respect to the interferometer is calculated.

Using information about the object's location, its optical prescription and optical prescription of the interferometer, a Computer Generated Reference (CGR) (phase map and a set of corresponding fringes at the detector plane) is calculated and generated.

The measured object is placed at the calculated optimal position and location.

Interference fringes from the interferometer are superimposed onto the computer generated fringes from the CGR to create a moiré pattern. The moiré fringes are used to finalize the alignment.

A standard interferometric measurement is taken using standard phase-shifting measurement techniques and a wrapped phase is calculated from the set of recorded interferograms.

The wrapped phase map is subtracted from the re-wrapped phase of the Computer Generated Reference resulting in a wrapped phase of the phase map of differences of the measured object and its theoretical model.

The wrapped phase of differences is unwrapped using standard unwrapping algorithms. The unwrapped phase map represents the final result of the measurement describing the differences between measured object and its prescription.

By using the CGR and the measurement procedure outlined above, it is possible to avoid the drawbacks in the prior art of measuring aspheric surfaces with an interferometer equipped with flat or spherical reference. In particular, the alignment of the aspherical object to be measured can be significantly aided and simplified by standard nulling procedures utilizing the moiré fringes, as opposed to the precision alignment of multiple optical components required by prior art techniques. Also, the unwrapping of very dense fringe patterns can be avoided by calculating a differential map between measured object and its theoretical model which requires only standard unwrapping algorithms. Augmentation of noise in the measurement through ray tracing can be also eliminated because the proposed method does not require ray tracing based on the measured phase distributions.

What is claimed is:

1. A method of measuring the surface of an aspheric object, comprising the steps of:

providing an interferometer, calculating a theoretical phase map and theoretical interference fringes at a plane of the interferometer, resulting from a theoretical interference of a beam of light reflected from a reference element and a beam of light reflected from a theoretical model of the object, based on an optical prescription of the object, taking into account optical prescription of the interferometer; and generating a phase map and theoretical interference fringes corresponding to the calculated theoretical phase map and interference fringes.

2. The method of claim 1, further comprising the steps of:

superimposing interference fringes produced from the interference of a beam of light reflected from the reference element and a beam of light reflected from the object onto the generated interference fringes, thereby creating moiré fringes;

subtracting a wrapped phase map resulting from the interference of the beam of light reflected from the reference element and the beam of light reflected from the object from the wrapped theoretical phase map;

unwrapping the resulting phase map of differences; and processing the resulting phase map of differences to determine the differences between the measured object and its theoretical prescription.

3. The method of claim 2, further comprising the step of:

positioning the object at a calculated optimal position with respect to the interferometer, based on theoretical properties of the object.

4. The method of claim 2, further comprising the step of:

adjusting the position of the object using the Moiré fringes as guides.

5. The method of claim 2, further comprising the step of:

scanning the object with a scanning device.

6. The method of claim 2, wherein the interference fringes are resolved by a sub-Nyquist camera.

7. The method of claim 2, wherein the interference fringes from the interference of a beam of light reflected from the reference element and a beam of light reflected from the object are produced in one of a Twyman-Green, Fizeau, Michaelson, Mach-Zender, or Fabry-Perot type interferometer.

8. A method of measuring the surface of an aspheric object, comprising the steps of:
   calculating a theoretical phase map and interference fringes resulting from the theoretical interference of a beam of light reflected from a reference element and a beam of light reflected from a theoretical model of the object, based on an optical prescription of the object;
   generating a phase map and interference fringes corresponding to the calculated theoretical phase map and interference fringes;
   superimposing interference fringes produced from the interference of a beam of light reflected from the reference element and a beam of light reflected from the object onto the generated interference fringes, thereby creating moiré fringes;
   subtracting a wrapped phase map resulting from the interference of the beam of light reflected from the reference element and the beam of light reflected from the object from the wrapped theoretical phase map;
   unwrapping the resulting wrapped phase map of differences; and
   processing the resulting phase map of differences to determine the differences between the measured object and its theoretical prescription.

9. The method of claim 8, further comprising the step of:
   positioning the object at a calculated optimal position with respect to the interferometer, based on theoretical properties of the object.

10. The method of claim 8, further comprising the step of:
    adjusting the position of the object using the Moiré fringes as guides.

11. The method of claim 8, further comprising the step of:
    scanning the object with a scanning device.

12. The method of claim 8, wherein the interference fringes are resolved by a sub-Nyquist camera.

13. The method of claim 8, wherein the interference fringes from the interference of a beam of light reflected from the reference element and a beam of light reflected from the object are produced in one of a Twyman-Green, Fizeau, Michaelson, Mach-Zender, or Fabry-Perot type interferometer.

14. A method of measuring the surface of an aspheric object, comprising the steps of:
    providing an interferometer,
    calculating a theoretical phase map and interference fringes at a plane of the interferometer, resulting from a theoretical interference of a beam of light reflected from a reference element and a beam of light reflected from a theoretical model of the object, based on an optical prescription of the object, taking into account optical prescription of the interferometer;
    generating a phase map and interference fringes corresponding to the calculated theoretical phase map and interference fringes;
    superimposing interference fringes produced from the interference of a beam of light reflected from the reference element and a beam of light reflected from the object onto the generated interference fringes, thereby creating moiré fringes;
    subtracting a wrapped phase map resulting from the interference of the beam of light reflected from the reference element and the beam of light reflected from the object from the wrapped theoretical phase map;
    unwrapping the resulting wrapped phase map of differences; and
    processing the resulting phase map of differences to determine the differences between the measured object and its theoretical prescription.

15. The method of claim 14, further comprising the step of:
    positioning the object at a calculated optimal position with respect to the interferometer, based on theoretical properties of the object.

16. The method of claim 14, further comprising the step of:
    adjusting the position of the object using the Moiré fringes as guides.

17. The method of claim 14, further comprising the step of:
    scanning the object with a scanning device.

18. The method of claim 14, wherein the interference fringes are resolved by a sub-Nyquist camera.

19. The method of claim 14, wherein the interference fringes from the interference of a beam of light reflected from the reference element and a beam of light reflected from the object are produced in one of a Twyman-Green, Fizeau, Michaelson, Mach-Zender, or Fabry-Perot type interferometer.

* * * * *